(12) United States Patent
Banks et al.

(10) Patent No.: US 11,949,527 B2
(45) Date of Patent: Apr. 2, 2024

(54) SHARED AUGMENTED REALITY EXPERIENCE IN VIDEO CHAT

(71) Applicant: Snap Inc., Santa Monica, CA (US)

(72) Inventors: Nathan Richard Banks, Merrylands (AU); Nathan Kenneth Boyd, Los Angeles, CA (US); Amanda Durham, Miami, FL (US); Alex Edelsburg, Seattle, WA (US); Maxim Maximov Lazarov, Culver City, CA (US); Ryan Thomas, Leichhardt (AU)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/660,520

(22) Filed: Apr. 25, 2022

(65) Prior Publication Data

US 2023/0344662 A1  Oct. 26, 2023

(51) Int. Cl.
*H04L 12/18* (2006.01)
*G06T 19/00* (2011.01)
*H04L 51/52* (2022.01)
*H04N 7/14* (2006.01)

(52) U.S. Cl.
CPC ........ *H04L 12/1818* (2013.01); *G06T 19/006* (2013.01); *H04L 12/1822* (2013.01); *H04L 51/52* (2022.05); *H04N 2007/145* (2013.01)

(58) Field of Classification Search
CPC . H04L 12/1818; H04L 12/1822; H04L 51/52; H04N 2007/145; H04N 7/157; H04N 7/147; G06T 19/006
See application file for complete search history.

(56) References Cited

U.S. PATENT DOCUMENTS 9,191,620 B1    11/2015  Katzer et al.
9,544,543 B2 *  1/2017   Setton ................... H04N 7/157
9,729,820 B1 *  8/2017   Holmes .................. H04N 7/152
(Continued)

FOREIGN PATENT DOCUMENTS

CN    109791346 A    5/2019
CN    110168478 A    8/2019
(Continued)

OTHER PUBLICATIONS

"Zoom's new video background has you rubbing virtual elbows. Here's how to use it", CNET Tech, [Online] Retrieved from the Internet: <URL: https://www.cnet.com/tech/services-and-software/zooms-new-video-background-has-you-rubbing-virtual-elbows-heres-how-to-use-it/>, (May 8, 2021), 2 pgs.
(Continued)

*Primary Examiner* — Benjamin M Thieu
(74) *Attorney, Agent, or Firm* — SCHWEGMAN LUNDBERG & WOESSNER, P.A.

(57) ABSTRACT

Methods and systems are disclosed for performing operations for providing a shared augmented reality experience in a video chat. A video chat can be established between a plurality of client devices. During the video chat, videos of users associated with the client devices can be displayed. During the video chat, a request from a first client device to activate a first AR experience can be received, and in response, and body parts of users depicted in the videos are modified to include one or more AR elements associated with the first AR experience.

20 Claims, 13 Drawing Sheets

(56) References Cited

U.S. PATENT DOCUMENTS

| | | | |
|---|---|---|---|
| 10,102,680 B2 | 10/2018 | Jurgenson et al. | |
| 10,311,644 B2 | 6/2019 | Rodriguez, II | |
| 10,481,680 B2 | 11/2019 | Panec et al. | |
| 10,540,575 B1 | 1/2020 | Brody | |
| 10,565,795 B2 | 2/2020 | Charlton et al. | |
| 10,607,053 B1 | 3/2020 | Boyd et al. | |
| 10,679,428 B1 | 6/2020 | Chen et al. | |
| 10,803,906 B1 | 10/2020 | Mourkogiannis et al. | |
| 10,997,787 B2 | 5/2021 | Ge et al. | |
| 11,063,937 B1 | 7/2021 | Son et al. | |
| 11,087,728 B1 | 8/2021 | Canberk et al. | |
| 11,089,427 B1 | 8/2021 | Canberk et al. | |
| 11,090,561 B2 | 8/2021 | Cahill et al. | |
| 11,092,998 B1 | 8/2021 | Castañeda et al. | |
| 11,112,945 B1 | 9/2021 | Al Majid et al. | |
| 11,169,600 B1 | 11/2021 | Canberk et al. | |
| 11,169,675 B1 | 11/2021 | Anvaripour et al. | |
| 11,176,723 B2 | 11/2021 | Krishnan Gorumkonda et al. | |
| 11,176,737 B2 | 11/2021 | Hare et al. | |
| 11,178,375 B1 | 11/2021 | Katz et al. | |
| 11,189,104 B2 | 11/2021 | Goodrich et al. | |
| 11,196,816 B2 | 12/2021 | Al Majid et al. | |
| 11,204,959 B1 | 12/2021 | Boyd et al. | |
| 11,215,827 B1 | 1/2022 | Zhang | |
| 11,217,020 B2 | 1/2022 | Goodrich et al. | |
| 11,227,442 B1 | 1/2022 | Goodrich et al. | |
| 11,232,646 B2 | 1/2022 | Goodrich et al. | |
| 11,258,738 B1 | 2/2022 | Cieslak et al. | |
| 11,263,817 B1 | 3/2022 | Goodrich et al. | |
| 11,270,491 B2 | 3/2022 | Monroy-Hernández et al. | |
| 11,275,453 B1 | 3/2022 | Tham et al. | |
| 11,277,597 B1 | 3/2022 | Canberk et al. | |
| 11,539,918 B1 * | 12/2022 | Libin | H04L 12/1827 |
| 11,800,060 B1 * | 10/2023 | Libin | H04N 7/157 |
| 2007/0242006 A1 * | 10/2007 | Lin | G09G 3/3225 |
| | | | 345/82 |
| 2012/0281059 A1 * | 11/2012 | Chou | H04L 12/1827 |
| | | | 348/E7.083 |
| 2013/0023306 A1 * | 1/2013 | Somei | H04M 1/72484 |
| | | | 455/556.1 |
| 2014/0240444 A1 * | 8/2014 | Szymczyk | H04N 7/157 |
| | | | 348/14.07 |
| 2015/0156803 A1 * | 6/2015 | Ballard | H04W 76/10 |
| | | | 455/422.1 |
| 2015/0213650 A1 * | 7/2015 | Barzuza | H04L 67/131 |
| | | | 348/14.07 |
| 2015/0271488 A1 * | 9/2015 | Gu | H04N 19/119 |
| | | | 375/240.16 |
| 2016/0188585 A1 | 6/2016 | Durham et al. | |
| 2017/0053447 A1 * | 2/2017 | Chen | G06T 19/006 |
| 2017/0169617 A1 | 6/2017 | Rodriguez, II | |
| 2018/0020180 A1 | 1/2018 | Park et al. | |
| 2018/0276895 A1 * | 9/2018 | Hodge | G09G 5/003 |
| 2019/0020853 A1 * | 1/2019 | Segal | H04N 7/15 |
| 2019/0379843 A1 * | 12/2019 | Lam | H04N 7/147 |
| 2020/0074738 A1 | 3/2020 | Hare et al. | |
| 2020/0183943 A1 | 6/2020 | Lupin et al. | |
| 2020/0219312 A1 | 7/2020 | Jurgenson et al. | |
| 2020/0250888 A1 | 8/2020 | Mcphee et al. | |
| 2020/0342665 A1 | 10/2020 | Eastham et al. | |
| 2020/0356760 A1 | 11/2020 | Li et al. | |
| 2020/0409511 A1 | 12/2020 | Cowburn et al. | |
| 2020/0410763 A1 | 12/2020 | Hare et al. | |
| 2020/0410764 A1 | 12/2020 | Cowburn et al. | |
| 2020/0412864 A1 | 12/2020 | Al Majid et al. | |
| 2020/0412975 A1 | 12/2020 | Al Majid et al. | |
| 2021/0065448 A1 | 3/2021 | Goodrich et al. | |
| 2021/0065464 A1 | 3/2021 | Goodrich et al. | |
| 2021/0067756 A1 | 3/2021 | Goodrich et al. | |
| 2021/0067836 A1 | 3/2021 | Hornsby et al. | |
| 2021/0074069 A1 | 3/2021 | Charlton et al. | |
| 2021/0076173 A1 | 3/2021 | Monroy-Hernández et al. | |
| 2021/0081088 A1 | 3/2021 | Voss | |
| 2021/0097245 A1 | 4/2021 | Monroy-Hernández | |
| 2021/0097743 A1 | 4/2021 | Krishnan Gorumkonda et al. | |
| 2021/0099551 A1 | 4/2021 | Cieslak et al. | |
| 2021/0099639 A1 | 4/2021 | Bartow et al. | |
| 2021/0150719 A1 | 5/2021 | Cowburn et al. | |
| 2021/0200390 A1 | 7/2021 | Luo et al. | |
| 2021/0200776 A1 | 7/2021 | Pounds et al. | |
| 2021/0201036 A1 | 7/2021 | Gupta et al. | |
| 2021/0201392 A1 | 7/2021 | Aghdall et al. | |
| 2021/0203627 A1 | 7/2021 | Luo et al. | |
| 2021/0203628 A1 | 7/2021 | Luo et al. | |
| 2021/0241532 A1 | 8/2021 | Daniels et al. | |
| 2021/0264949 A1 | 8/2021 | Huang | |
| 2021/0279969 A1 | 9/2021 | Cowburn et al. | |
| 2021/0303075 A1 | 9/2021 | Cowburn et al. | |
| 2021/0303110 A1 | 9/2021 | Giacalone et al. | |
| 2021/0304429 A1 | 9/2021 | Cowburn et al. | |
| 2021/0304453 A1 | 9/2021 | Kehrwald et al. | |
| 2021/0304505 A1 | 9/2021 | Anvaripour et al. | |
| 2021/0304506 A1 | 9/2021 | Mourkogiannis et al. | |
| 2021/0304629 A1 | 9/2021 | Barron et al. | |
| 2021/0306451 A1 | 9/2021 | Heikkinen et al. | |
| 2021/0312523 A1 | 10/2021 | Luo et al. | |
| 2021/0312533 A1 | 10/2021 | Luo et al. | |
| 2021/0312672 A1 | 10/2021 | Luo et al. | |
| 2021/0312678 A1 | 10/2021 | Luo et al. | |
| 2021/0312682 A1 | 10/2021 | Krishnan Gorumkonda et al. | |
| 2021/0312690 A1 | 10/2021 | Krishnan Gorumkonda et al. | |
| 2021/0319612 A1 | 10/2021 | Monroy-Hernandez et al. | |
| 2021/0319625 A1 | 10/2021 | Goodrich et al. | |
| 2021/0328955 A1 | 10/2021 | Collins et al. | |
| 2021/0360056 A1 | 11/2021 | Baron et al. | |
| 2021/0367914 A1 | 11/2021 | Collins et al. | |
| 2021/0373726 A1 | 12/2021 | Boyd et al. | |
| 2021/0375048 A1 | 12/2021 | Kang et al. | |
| 2021/0382585 A1 | 12/2021 | Collins et al. | |
| 2021/0382587 A1 | 12/2021 | Heikkinen et al. | |
| 2021/0382616 A1 | 12/2021 | Gale et al. | |
| 2021/0383373 A1 | 12/2021 | Eirinberg et al. | |
| 2021/0385179 A1 | 12/2021 | Heikkinen et al. | |
| 2021/0387090 A1 | 12/2021 | Eirinberg et al. | |
| 2021/0387097 A1 | 12/2021 | Desserrey et al. | |
| 2021/0389850 A1 | 12/2021 | Charlton et al. | |
| 2021/0389932 A1 | 12/2021 | Mandia | |
| 2021/0389996 A1 | 12/2021 | Charlton et al. | |
| 2021/0390729 A1 | 12/2021 | Fox-roberts et al. | |
| 2021/0390745 A1 | 12/2021 | Rykhliuk et al. | |
| 2021/0390784 A1 | 12/2021 | Smith et al. | |
| 2021/0392141 A1 | 12/2021 | Mandia | |
| 2021/0392296 A1 * | 12/2021 | Rabinovich | G06T 7/70 |
| 2021/0392460 A1 | 12/2021 | Gorkin et al. | |
| 2021/0397000 A1 | 12/2021 | Rodriguez, II | |
| 2021/0404831 A1 | 12/2021 | Drummond et al. | |
| 2021/0405745 A1 | 12/2021 | Canberk | |
| 2021/0405831 A1 | 12/2021 | Mourkogiannis et al. | |
| 2021/0405832 A1 | 12/2021 | Brown et al. | |
| 2021/0406447 A1 | 12/2021 | Hermann et al. | |
| 2021/0406543 A1 | 12/2021 | Drummond et al. | |
| 2021/0406965 A1 | 12/2021 | Anvaripour et al. | |
| 2021/0407163 A1 | 12/2021 | Chai et al. | |
| 2021/0407506 A1 | 12/2021 | Drummond et al. | |
| 2021/0409502 A1 | 12/2021 | Chepizhenko et al. | |
| 2021/0409517 A1 | 12/2021 | Luo et al. | |
| 2021/0409610 A1 | 12/2021 | Mandia et al. | |
| 2021/0409612 A1 | 12/2021 | Mandia et al. | |
| 2021/0409616 A1 | 12/2021 | Chan et al. | |
| 2022/0019640 A1 | 1/2022 | Hermann et al. | |
| 2022/0020194 A1 | 1/2022 | Luo et al. | |
| 2022/0029943 A1 | 1/2022 | Desserrey et al. | |
| 2022/0053146 A1 | 2/2022 | Alavi et al. | |
| 2022/0070129 A1 | 3/2022 | Boyd et al. | |
| 2022/0075591 A1 | 3/2022 | Cardenas Gasca et al. | |
| 2022/0075819 A1 | 3/2022 | Boyd et al. | |
| 2022/0076492 A1 | 3/2022 | Smith et al. | |
| 2022/0076497 A1 | 3/2022 | Goodrich et al. | |
| 2022/0076500 A1 | 3/2022 | Goodrich et al. | |
| 2022/0076504 A1 | 3/2022 | Goodrich et al. | |
| 2022/0078143 A1 | 3/2022 | Eirinberg et al. | |
| 2022/0078391 A1 | 3/2022 | Katz et al. | |
| 2022/0084295 A1 | 3/2022 | Smith et al. | |

(56) References Cited

U.S. PATENT DOCUMENTS

| | | | |
|---|---|---|---|
| 2022/0086111 A1 | 3/2022 | Smith et al. | |
| 2022/0086235 A1 | 3/2022 | Al Majid et al. | |
| 2022/0086367 A1 | 3/2022 | Boyd et al. | |
| 2022/0157342 A1* | 5/2022 | Kliushkin | G11B 27/036 |
| 2023/0146178 A1* | 5/2023 | Haro | G06F 3/04847 |
| | | | 381/303 |
| 2023/0164298 A1* | 5/2023 | Khot | H04N 7/15 |
| | | | 348/14.08 |
| 2023/0254438 A1* | 8/2023 | Sherman | H04N 7/157 |
| | | | 348/239 |
| 2023/0300292 A1* | 9/2023 | Barbosa da Silva | |
| | | | H04L 12/1827 |
| | | | 348/14.07 |

FOREIGN PATENT DOCUMENTS

| | | |
|---|---|---|
| CN | 113383369 A | 9/2021 |
| CN | 114080628 A | 2/2022 |
| EP | 3901951 A1 | 10/2021 |
| KR | 101058803 | 8/2011 |
| KR | 20160086560 | 7/2016 |
| KR | 20180006951 A | 1/2018 |
| KR | 20200082714 | 7/2020 |
| KR | 20210034638 A | 3/2021 |
| KR | 20210039496 A | 4/2021 |
| KR | 20210103525 A | 8/2021 |
| KR | 20210121182 A | 10/2021 |
| KR | 20210145214 A | 12/2021 |
| WO | WO-02099669 A1 | 12/2002 |
| WO | WO-2021042134 A1 | 3/2021 |
| WO | WO-2021051134 A1 | 3/2021 |
| WO | WO-2021067988 A1 | 4/2021 |
| WO | WO-2021119662 A1 | 6/2021 |
| WO | WO-2021133942 A1 | 7/2021 |
| WO | WO-2021138161 A1 | 7/2021 |
| WO | WO-2021138630 A1 | 7/2021 |
| WO | WO-2021158768 A1 | 8/2021 |
| WO | WO-2021163725 A1 | 8/2021 |
| WO | WO-2021194755 A1 | 9/2021 |
| WO | WO-2021194855 A1 | 9/2021 |
| WO | WO-2021195192 A1 | 9/2021 |
| WO | WO-2021195670 A1 | 9/2021 |
| WO | WO-2021202191 A1 | 10/2021 |
| WO | WO-2021203118 A1 | 10/2021 |
| WO | WO-2021216999 A1 | 10/2021 |
| WO | WO-2021217167 A1 | 10/2021 |
| WO | WO-2021222107 A1 | 11/2021 |
| WO | WO-2021222198 A1 | 11/2021 |
| WO | WO-2021222225 A1 | 11/2021 |
| WO | WO-2021222386 A1 | 11/2021 |
| WO | WO-2021226341 A1 | 11/2021 |
| WO | WO-2021231708 A1 | 11/2021 |
| WO | WO-2021242634 A1 | 12/2021 |
| WO | WO-2021242765 A1 | 12/2021 |
| WO | WO-2021242985 A1 | 12/2021 |
| WO | WO-2021252201 A2 | 12/2021 |
| WO | WO-2021252218 A1 | 12/2021 |
| WO | WO-2021252233 A1 | 12/2021 |
| WO | WO-2021252237 A1 | 12/2021 |
| WO | WO-2021252242 A2 | 12/2021 |
| WO | WO-2021252255 A1 | 12/2021 |
| WO | WO-2021252386 A1 | 12/2021 |
| WO | WO-2021252759 A1 | 12/2021 |
| WO | WO-2021252763 A1 | 12/2021 |
| WO | WO-2021253048 A1 | 12/2021 |
| WO | WO-2021257401 A1 | 12/2021 |
| WO | WO-2021257450 A1 | 12/2021 |
| WO | WO-2021257616 A1 | 12/2021 |
| WO | WO-2021257619 A1 | 12/2021 |
| WO | WO-2021263210 A1 | 12/2021 |
| WO | WO-2022005687 A1 | 1/2022 |
| WO | WO-2022005693 A1 | 1/2022 |
| WO | WO-2022005698 A1 | 1/2022 |
| WO | WO-2022005708 A1 | 1/2022 |
| WO | WO-2022005715 A1 | 1/2022 |
| WO | WO-2022005717 A1 | 1/2022 |
| WO | WO-2022005720 A1 | 1/2022 |
| WO | WO-2022005726 A1 | 1/2022 |
| WO | WO-2022005733 A1 | 1/2022 |
| WO | WO-2022005734 A1 | 1/2022 |
| WO | WO-2022005794 A1 | 1/2022 |
| WO | WO-2022005838 A1 | 1/2022 |
| WO | WO-2022005841 A1 | 1/2022 |
| WO | WO-2022005843 A1 | 1/2022 |
| WO | WO-2022005845 A1 | 1/2022 |
| WO | WO-2022005946 A1 | 1/2022 |
| WO | WO-2022006069 A1 | 1/2022 |
| WO | WO-2022006116 A1 | 1/2022 |
| WO | WO-2022006138 A1 | 1/2022 |
| WO | WO-2022006170 A1 | 1/2022 |
| WO | WO-2022006249 A1 | 1/2022 |
| WO | WO-2022006279 A1 | 1/2022 |
| WO | WO-2022006289 A1 | 1/2022 |
| WO | WO-2022006318 A1 | 1/2022 |
| WO | WO-2022015865 A1 | 1/2022 |
| WO | WO-2022047463 A1 | 3/2022 |
| WO | WO-2022047477 A1 | 3/2022 |
| WO | WO-2022055992 A1 | 3/2022 |
| WO | WO-2022056118 A1 | 3/2022 |
| WO | WO-2022056132 A2 | 3/2022 |

OTHER PUBLICATIONS

"International Application Serial No. PCT US2023 018324, International Search Report dated Jul. 31, 2023", 3 pgs.

"International Application Serial No. PCT US2023 018324, Written Opinion dated Jul. 31, 2023", 5 pgs.

* cited by examiner

SHARED AUGMENTED REALITY EXPERIENCE IN VIDEO CHAT

TECHNICAL FIELD

The present disclosure relates generally to providing augmented reality experiences using a software application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
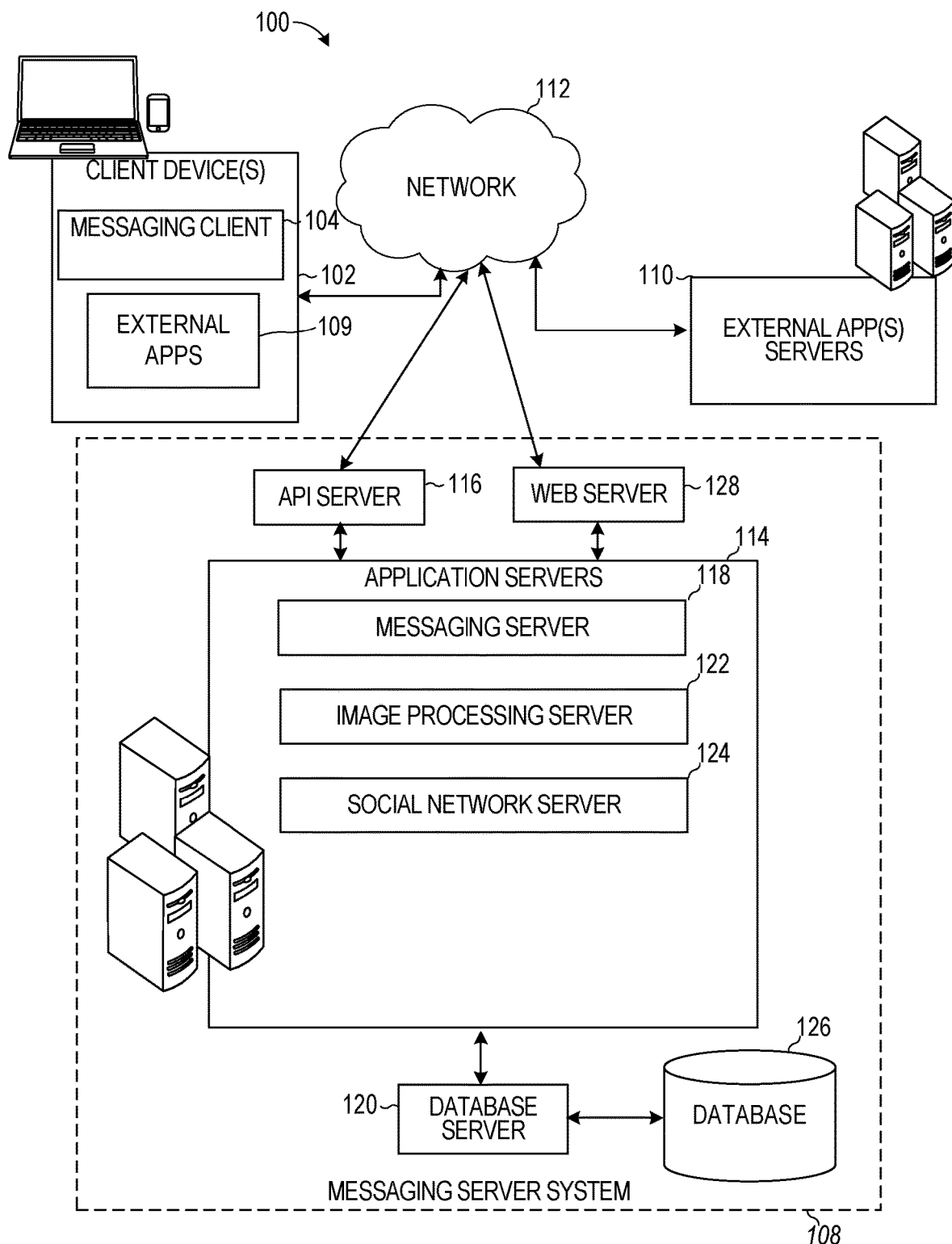
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Users often enjoy participating in video calls with each other. Usually, these video calls involve presenting real-time videos received from each of the client devices of the users in a simultaneous arrangement. Augmented reality (AR) and virtual reality (VR) systems provide opportunities for creating unique and engaging content which enhances user engagement with the applications. For example, AR experiences can be activated and/or launched independently by the users to modify their respective video feeds. As referred to herein, "AR experiences" include any type of augmented reality display of augmented reality graphics, sounds, videos, images, or content that enhance, modify, augment, overlay, change and/or have some other visual affect on a given real-time or stored video. Namely, a first user can modify the video feed being presented in the simultaneous arrangement based on a first AR experience and a second user can modify their respective video feed based on a second AR experience. In many cases, one user may not even know the other user is currently using or activating a particular AR experience which makes such AR experiences unengaging. There is no mechanism for the users to share the same AR experience on the video call.

The disclosed techniques improve the efficiency of using the electronic device by providing an AR or VR application that includes a shared AR experience on a video call between a plurality of users. Particularly, the disclosed techniques provide for the ability for two or more users to engage in a video call and have the same AR experience applied to their respective video feeds. In some cases, a new AR scene can be generated and used to incorporate at least part of the videos received from the respective client devices that have been modified based on elements of the AR scene. For example, an AR environment (e.g., virtual fish tank or virtual couch) can be generated for display to the plurality of users. Faces detected in respective video feeds received from client devices of the plurality of users can be modified and incorporated into respective virtual characters (e.g., virtual animated fish of different types), virtual objects, virtual animated objects, and so forth and added to the AR environment (e.g., AR fish tank and/or AR couch). This enables the users who are in different real-world environments to be placed in a common AR environment to conduct a video call. As a result, a realistic and more engaging shared user experience is provided.

In some examples, the disclosed techniques receive, from a first client device of a plurality of client devices, a request to establish a video call with a second client device. In response to receiving the request to establish the video call, the disclosed techniques establish a video call between the first and second client devices. The disclosed techniques generate, for concurrent display in a graphical user interface, a first video received from the first client device and a second video received from the second client device. The disclosed techniques receive a request from the first client device to activate a first AR experience. The disclosed techniques modify the first and second videos to include one or more AR elements associated with the first AR experience to enable users of the first and second client devices to access the first AR experience together.

This improves the overall experience of the user in using the electronic device. Also, by automating the inclusion of a shared AR experience in a video call, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109, using Application Programming Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
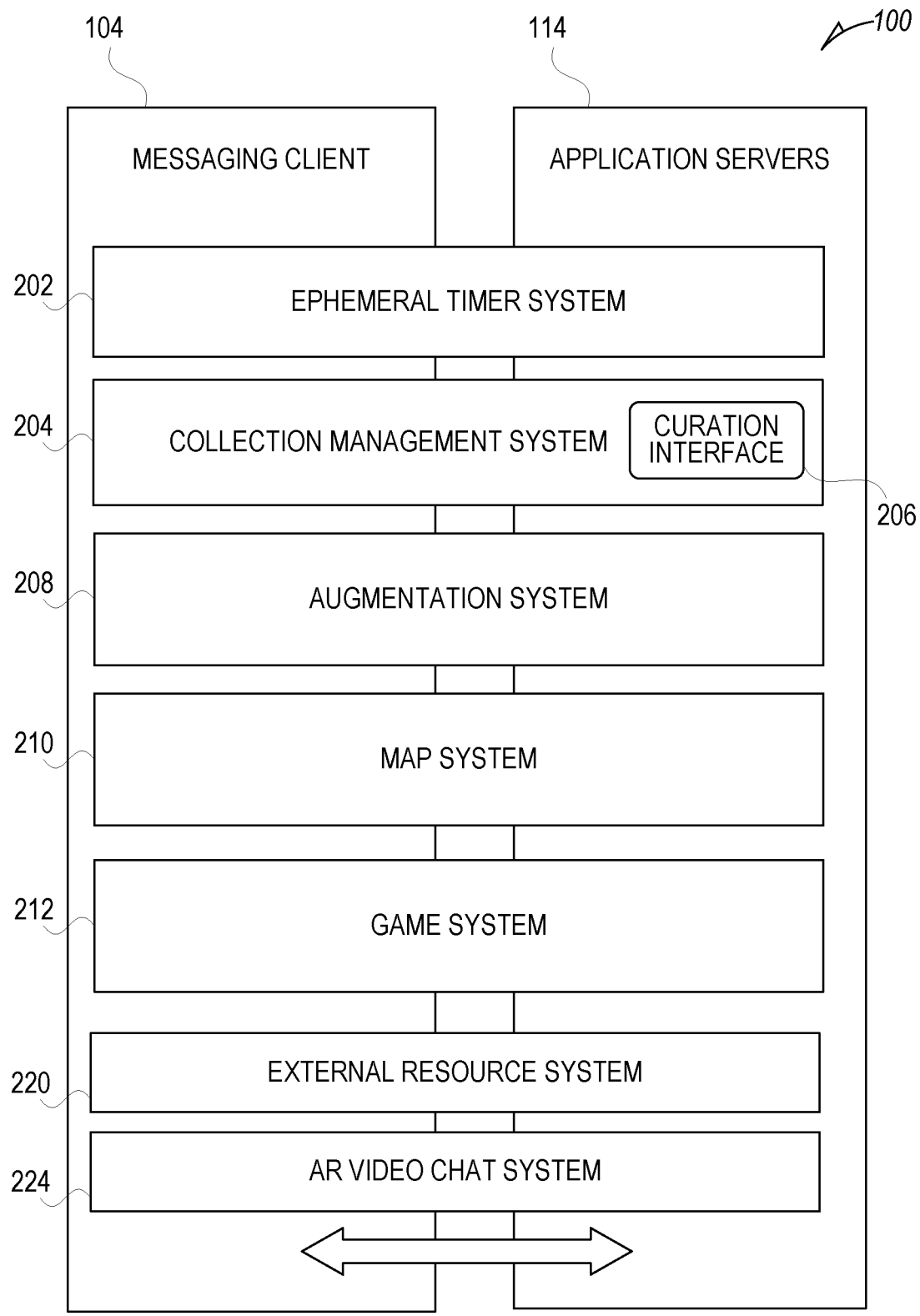
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video or modifying the garment based on a gesture performed by the user).

Figure 3:
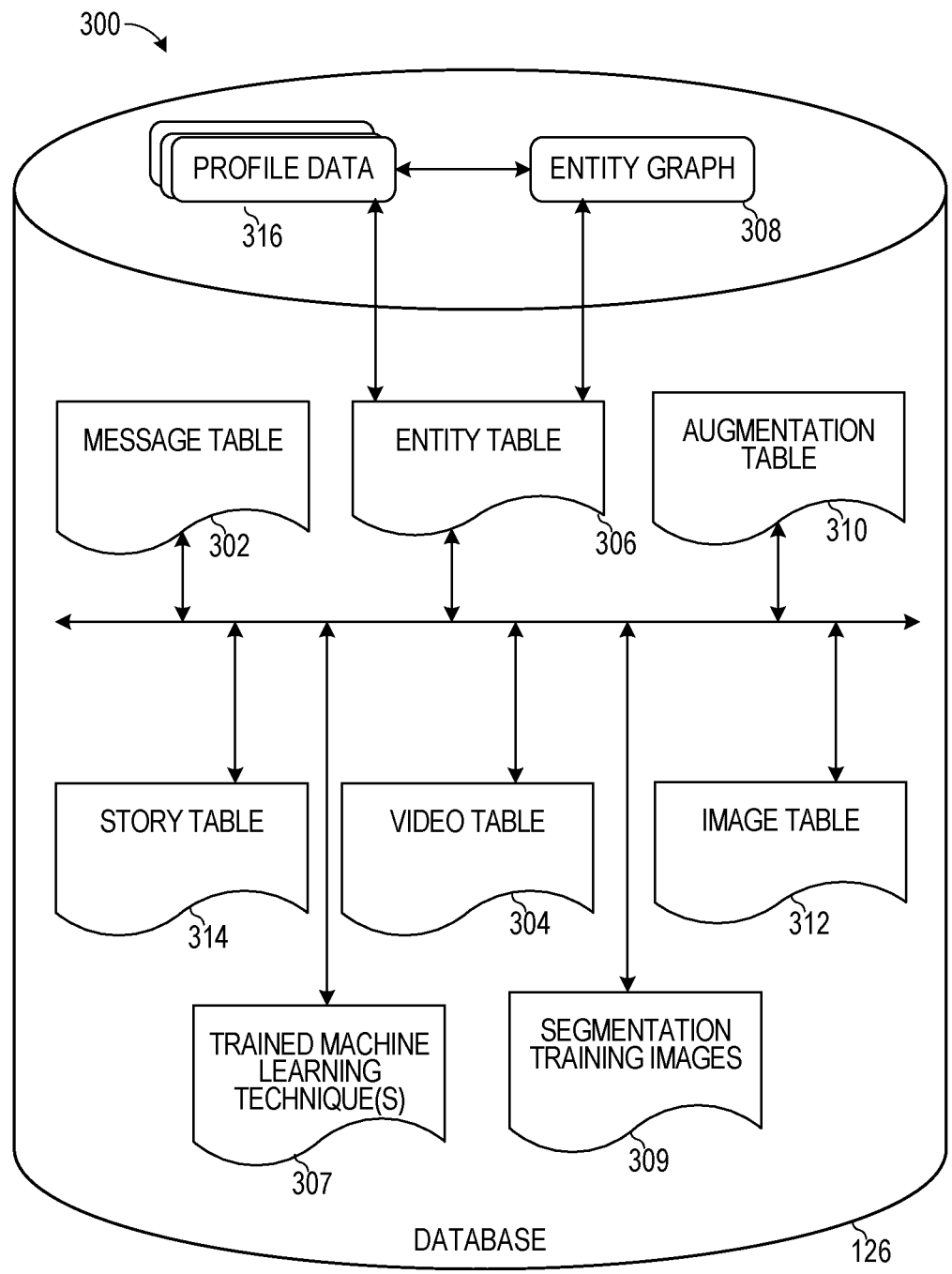
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a.*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can allow users to establish video calls with each other. To do so, the messaging client 104 on a first client device 102 receives a user request to start or establish a video call with one or more other users. The messaging client 104 transmits a communication to client devices of the one or more other users requesting that the one or more other users join the video call. Once the one or more other users select an option to join the video call, the messaging clients 104 implemented on the respective client devices generate a graphical user interface that depicts each of the users who are engaged in the video call. In some examples, the messaging clients 104 present real-time video feeds of each of the users engaged in the video call, such as in respective cells on the graphical user interface. In some examples, as part of starting or establishing the video call (or after the video call is established, such as during an in-progress call), the user can select an option to activate or launch a given AR experience as part of the video call. In such cases, the messaging client 104 transmits a notification to the recipient users identifying the given AR experience and indicating that the given user would like to start a video call in which the given AR experience is launched. In response to the recipient users selecting an option to join the video call with the given AR experience, the messaging clients 104 of the respective devices present video feeds received from the respective client devices 102 modified based on AR elements of the given AR experience. This creates a more engaging social user experience and increases the overall appeal and use of the messaging client 104 and the social network server 124.

In some examples, portions of the video feeds received from the respective client devices are cropped out, such as based on a face or body segmentation. The cropped out portions are then modified based on the AR elements of the AR experience, and the modified portions are then simultaneously presented in a same cell or in a full-screen display. In some examples, the generation of the modified portions including cropping and modifying of a video feed can be performed separately on each client device 102 that has joined the AR experience. In some examples, the generation of the modified portions including cropping and modifying of a video feed can be performed by a single client device 102 (for all of the other client devices 102) and then transmitted to all the other client devices 102 involved in the AR experience. In some examples, the generation of the modified portions including cropping and modifying of a video feed can be performed by a server and then transmitted to all the client devices 102 involved in the AR experience.

For example, the AR experience can correspond to different virtual fish swimming in a virtual fishbowl environment. In such cases, a first video feed received from a first client device (e.g., a first participant in the video chat) is processed to extract a first portion that includes only the face of the first participant. Similarly, a second video feed received from a second client device (e.g., a second participant in the video chat) is processed to extract a second portion that includes only the face of the second participant. The first and second portions including the first and second faces are modified based on the AR experience to represent the first face as a first virtual fish of a first type and to represent the second face as a second virtual fish of a second type or the same first type. The first and second virtual fish are then animated as swimming in the AR fishbowl and presented in the graphical user interface of the video call to the first and second client devices of the first and second participants.

In some examples, three or more users can participate in the video call. A first group of the users (e.g., two of the users) can request to activate or join a first type of AR experience, and a second group of users (e.g., one or more other users) can request to activate or join a second type of AR experience or can request not to have any AR experience authorized or launched. In such cases, the messaging client 104 can divide the graphical user interface associated with the video call into different cells or regions on the basis of the AR experience launched by the respective users. For example, a first region or cell can include video portions or depictions of the first group of users and the AR elements of the first type of AR experience applied to the video portions or depictions of the first group of users. Concurrently or together with the first region or cell, a second region or cell can be presented in the graphical user interface that depicts or represents the second group of users. In this way, a first section of the graphical user interface can be dedicated to presenting videos of users on the video call associated with the first type of AR experience, and a second section of the graphical user interface can be dedicated to presenting videos of users on the video call associated with the second type of AR experience or without any AR experience applied.

In this way, the messaging client 104 receives, from a first client device of a plurality of client devices, a request to establish a video call with a second client device. The messaging client 104, in response to receiving the request to establish the video call, establishes a video call between the first and second client devices. The messaging client 104 generates, for concurrent display in a graphical user interface, a first video received from the first client device and a second video received from the second client device. The messaging client 104 receives a request from the first client device to activate a first AR experience. The messaging client 104 modifies the first and second videos to include one or more AR elements associated with the first AR experience to enable users of the first and second client devices to access the first AR experience together.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data), such as during a video call between a plurality of users or participants.

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging, video call, group video call, and so forth) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The AR video chat system 224 allows a plurality of users to engage in a video call with each other while sharing an AR experience. The AR video chat system 224 can receive a request from a first user (via a first client device) to activate or start a video call with one or more other users. The request can identify a shared AR experience to launch in the video call. The AR video chat system 224 transmits the request to the identified users. In response to receiving approvals from the identified users to join the video call with the shared AR experience, the AR video chat system 224 generates a graphical user interface that includes respective videos received from client devices of the users in respective regions or in a shared region. The videos can include respective video streams being captured by a front-facing or rear-facing camera of each respective one of the plurality of client devices. The AR video chat system 224 can modify the received videos based on AR elements of the shared AR experience to allow each of the users to experience the shared AR experience together. The modified videos are presented at the same time to each of the users engaged in the video call. In some examples, the generation of the modified portions including cropping and modifying of a video feed can be performed separately on each client device 102 that has joined the AR experience. In some examples, the generation of the modified portions including cropping and modifying of a video feed can be performed by a single client device 102 (for all of the other client devices 102) and then transmitted to all the other client devices 102 involved in the AR experience. In some examples, the generation of the modified portions including cropping and modifying of a video feed can be performed by a server and then transmitted to all the client devices 102 involved in the AR experience.

In some cases, the AR experience can be associated with a particular theme and can include one or more AR elements that are part of the theme. In such cases, each of the videos is modified based on a different one of the AR elements that are part of the theme. For example, a video of a first participant can be modified using a first set of AR elements (e.g., to represent the first participant as a first virtual fish or a first virtual alien) while video of a second participant can be modified using a second set of AR elements (e.g., to represent the second participant as a second virtual fish or a second virtual alien).

The AR video chat system 224 can be a component that can be accessed by an AR/VR application implemented on the client device 102 of each respective user of the video call. The AR/VR application uses an RGB camera to capture a monocular image or video of a real-world environment. The AR/VR application applies various trained machine learning techniques on the captured image or video to apply one or more AR visual effects (e.g., to display a virtual AR element that is part of an AR experience) to the captured image or video. In some implementations, the AR/VR application continuously captures images or a video of the real-world environment in real time or periodically to continuously or periodically update the applied one or more visual effects. This allows the users to move around in the real world and see the one or more visual effects update in real time. While the disclosed examples are provided with respect to monocular RGB images, similar techniques are applicable to any other type of image, such as images captured with a dual camera, lidar, and other sensors that may be available on a client device 102.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process.

Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the AR video chat system 224. For example, trained machine learning techniques 307 stores the trained parameters of one or more neural network machine learning techniques.

Segmentation training images 309 stores a plurality of images that each depict whole bodies of one or more users in different poses. The plurality of images stored in the segmentation training images 309 includes various depictions of one or more users in different poses together with segmentations of the different poses that indicate which pixels in the images correspond to the whole-body parts and which pixels correspond to a background. Namely the segmentations provide the borders of the whole bodies of the users depicted in the images. These segmentation training images 309 are used by the AR video chat system 224 to train the machine learning technique used to generate a segmentation of whole bodies of users depicted in a received RGB monocular image. In some cases, the segmentation training images 309 include ground truth skeletal key points of one or more whole bodies depicted in the respective training monocular images. The segmentation training images 309 can include labeled and unlabeled image and video data. The segmentation training images 309 can include a depiction of a whole body of a particular user, an image that lacks a depiction of any user (e.g., a negative image), a depiction of a plurality of users wearing different garments, and depictions of users wearing garments at different distances from an image capture device, such as for a virtual try-on AR experience.

Data Communications Architecture

Figure 4:
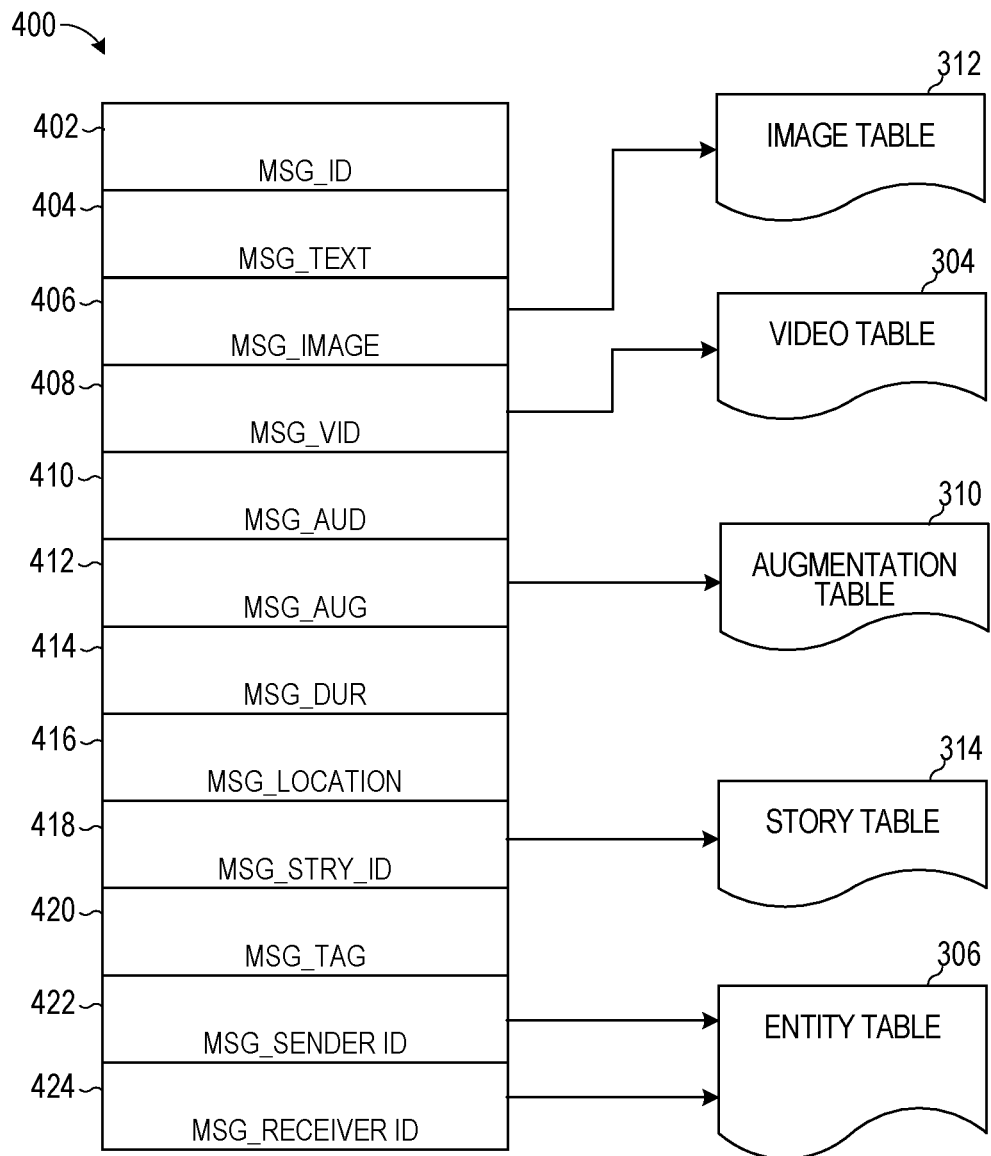
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Ar Video Chat System

Figure 5:
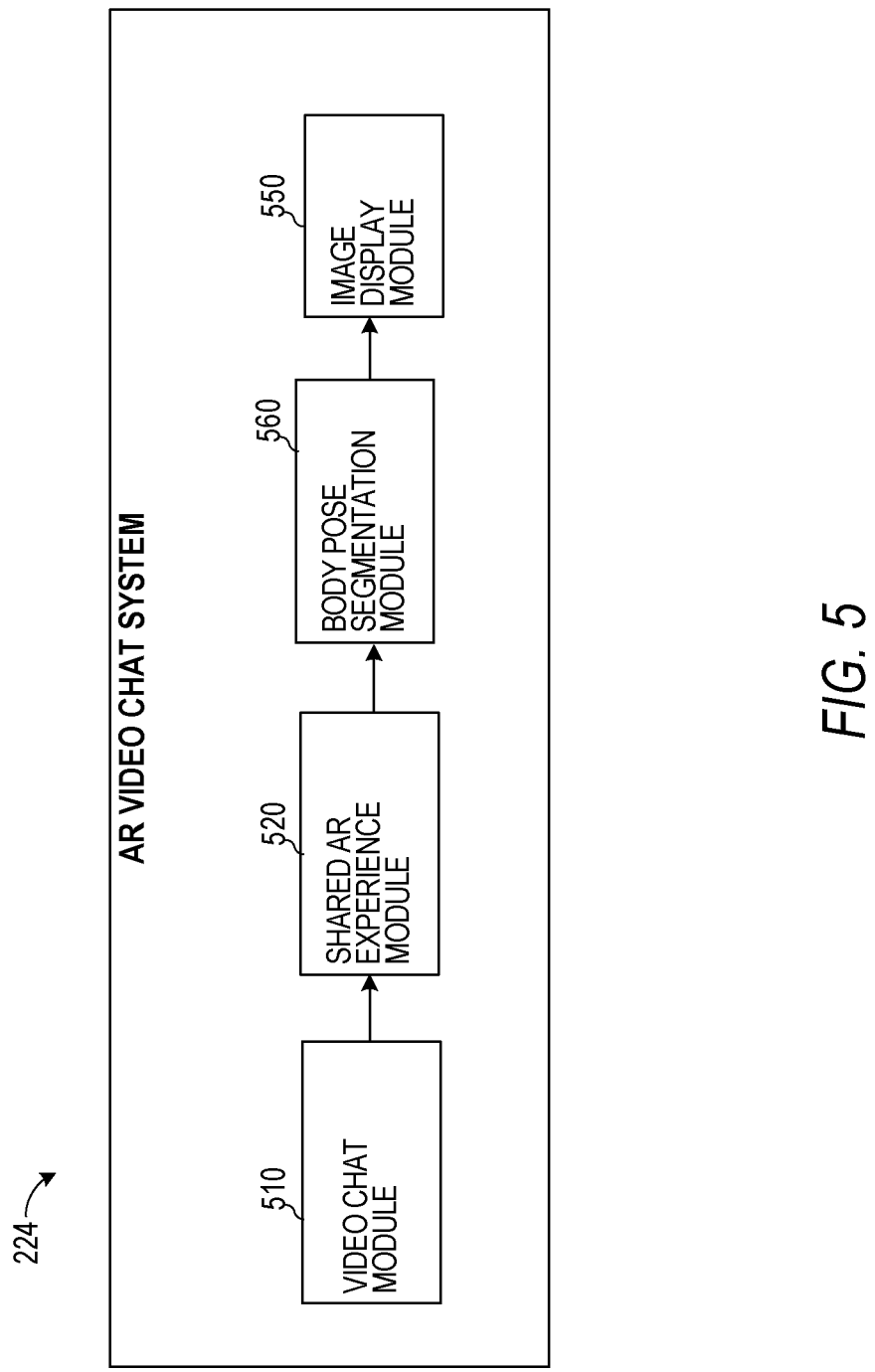
FIG. 5 is a block diagram showing an example AR video chat system, according to some examples.

FIG. 5 is a block diagram showing an example AR video chat system 224, according to some examples. AR video chat system 224 includes a video chat module 510, a shared AR experience module 520, a body pose segmentation module 560, and an image display module 550. The video chat module 510 is activated in response to receiving input from a user to launch a video chat session or to establish a video chat session with one or more other users.

For example, the video chat module 510 can present a list of different shared AR experiences to a first user of the group of users on a display of the client device 102 of the first user.

The video chat module 510 can detect input that navigates through the list such as by swiping left or right. Each shared AR experience in the list is represented by a different corresponding AR experience icon. In response to detecting selection of the shared AR experience icon corresponding to the shared AR experience, the video chat module 510 activates the shared AR experience module 520. The video chat module 510 can request input from the first user that identifies a second user or a plurality of friends. The video chat module 510 communicates with the client devices 102 of the second user or the plurality of friends. The video chat module 510 provides an identification of the shared AR experience selected by the first user. The client device 102 of the second user or the plurality of friends provide notifications that invite the second user or the plurality of friends to join the shared AR experience with the first user. In response to receiving input from the client device 102 of the second user accepting the invitation to join the shared AR experience, the AR video chat system 224 adds the second user to the shared AR experience launched by the first user and establishes a video chat between the first and second users. In some cases, the input from the client device 102 of the second user can be received during an in-progress call between the first and second users.

In some cases, the client device 102 of the second user may not support the shared AR experience selected by the client device 102 of the first user. In such circumstances, the request from the client device 102 of the first can be timed out. After timing out the request, the client device 102 of the first user can allow the first user to experience the shared AR experience alone or without the second user. As an alternative, after timing out the request, the client device 102 of the first user can be informed that the selected shared AR experience is incompatible with the client device 102 of the second user and can provide a list of different shared AR experiences that are compatible.

In some examples, the video chat module 510 can communicate with each client device 102 involved in the video chat session to obtain a list of identifiers of shared AR experiences available to each client device 102. For example, a first client device 102 can provide a first group of shared AR experiences that are installed on the first client device 102 and a second client device 102 can provide a second group of shared AR experiences that are installed on the second client device 102. The video chat module 510 compares the first and second groups and identifies a set of shared AR experiences that are installed, implemented or available in both the first and second groups. The video chat module 510 can then present in the list of different shared AR experiences only those shared AR experiences that are in the identified set. In some examples, the first user selects to launch an AR experience on the first client device 102 that is not available (is unavailable) on the second client device 102 of the second user. In such cases, the notification to join that is sent to the second client device 102 can include an option to both install (or download) the AR experience and immediately (without further user input) launch the shared AR experience in the video chat session. In some cases, the notification to join that is sent to the second client device 102 can include temporary authorization to access or launch the shared AR experience. In such instances, in response to receiving a request from the second client device 102 to join the shared AR experience, the video chat module 510 obtains temporary rights for the second client device 102 to access the shared AR experience. Upon the video chat session being terminated by any user, the video chat module 510 immediately removes the temporary rights for the second client device 102, preventing the second client device 102 from further accessing the shared AR experience outside of the video chat session.

In some examples, the video chat module 510 receives a user selection of one or more target users with whom a user is interested in starting a video chat session. The video chat module 510 communicates with the target users and, in response to determining that the target users accept the invitation to join the video chat, the video chat module 510 establishes a video chat session between the users. After establishing the video chat session, the video chat module 510 can present the list of different shared AR experiences to a first user of the group of users on a display of the client device 102 of the first user. The video chat module 510 can detect input that navigates through the list such as by swiping left or right. In response to detecting selection of the shared AR experience icon corresponding to the shared AR experience, the video chat module 510 activates the shared AR experience module 520. The video chat module 510 communicates with client devices 102 of the second user or the plurality of friends and provides an identification of the shared AR experience selected by the first user. The client devices 102 of the second user or the plurality of friends provide notifications with an option for the second user or the plurality of friends to join the shared AR experience with the first user. In response to receiving input from the client device 102 of the second user accepting the invitation to join the shared AR experience, the AR video chat system 224 applies the selected shared AR experience to video feeds received from client devices of the first and second users.

In some examples, after the second user accepts the invitation to join the shared AR experience selected by the first user, the second user is prevented from activating or launching a second (different) AR experience for a threshold period of time (e.g., 5 seconds). Namely, the second user cannot launch or change the shared AR experience until the threshold period of time elapses. In some examples, the second user can leave the shared AR experience and start a new AR experience. The first user can be notified of the new AR experience and be provided with an option to join the second user in the new AR experience. For example, input from a client device 102 of the second user can be received that selects a second AR experience. In response, the videos of the first and second users are now modified based on the second AR experience instead of the shared AR experience. In some cases, once a user accepts an invitation to join a particular shared AR experience, the user is automatically opted in to joining any other shared AR experience that is selected to be launched during the video chat by any other user. For example, after the second user selects the option to join the shared AR experience, the video of the second user is modified based on the shared AR experience. At a later time, the first user can select a second shared AR experience. In response, the video of the second user is modified based on the second shared AR experience without notifying the second user or providing the second user with the option to join the second shared AR experience. This provides a seamless and continuous shared AR experience to all users involved in a video chat.

In some cases, the video chat module 510 provides identifiers of the video feeds for which users engaged in the video chat have selected to have a shared AR experience applied. The identifiers are provided to the shared AR experience module 520. The shared AR experience module 520 retrieves graphical elements or AR elements associated with the selected shared AR experience. The shared AR experience module 520 applies a first set of AR elements to a first video feed or portion of the first video feed associated with a first of the identifiers and concurrently applies a second set of AR elements to a second video feed or portion of the second video feed associated with a second of the identifiers.

In some cases, the shared AR experience module 520 can determine that the shared AR experience is associated with a particular body part, such as a face or other body part. In such cases, the shared AR experience module 520 communicates with the body pose segmentation module 560 to obtain segmentations of the body parts associated with the shared AR experience. The shared AR experience module 520 can then crop out portions of the video streams associated with the first and second users based on the segmentation received from the body pose segmentation module 506. The shared AR experience module 520 can then selectively apply the AR elements to the video portions of the first and second users that have been cropped out. The shared AR experience module 520 can monitor voice input of users involved in the shared AR experience. The shared AR experience module 520 can modify one or more AR elements associated with the shared AR experience based on voice input received from the users in the video chat that elected to join the shared AR experience.

The body pose segmentation module 560 can apply one or more trained machine learning techniques on the videos received from the client devices involved in the video chat to generate first and second whole-body segmentations (or partial body segmentations) of the first and second users depicted respectively in the videos. The body pose segmentation module 560 can apply the segmentations to extract, crop, and/or track portions of the video that correspond to the first and second whole-body segmentations. In some examples, the body pose segmentation module 560 can detect faces in first and second videos received from first and second users involved in a video chat. The body pose segmentation module 560 can extract and track only the portions of the videos that depict the faces and provide those extracted portions to the shared AR experience module 520. The shared AR experience module 520 can then apply the AR elements of the shared AR experience to the extracted portions of the videos.

After modifying the videos based on the shared AR experience, the shared AR experience module 520 provides the modified videos to the image display module 550. The image display module 550 can render a graphical user interface that includes one or more regions or cells. Each region or cell can include a depiction of a video or modified video received from a client device 102 of a user involved in a video chat session. In some examples, the image display module 550 can identify groups of users involved in the video chat session that have joined a same shared AR experience. The image display module 550 can assign the identified groups of users to a same region or cell in the graphical user interface. In this way, the image display module 550 can present a first region or cell that includes videos or portions of videos of users that requested to participate in a first AR experience and can present a second region or cell that includes videos or portions of videos of users that requested to participate in a second AR experience or for which authorizations to join any AR experience has not been received.

In some cases, input from a user for which the video is displayed in the second region or cell can be received that requests to join the first AR experience of the users for which the videos are displayed in the first region. In response to this input, the image display module 550 can modify the video that is displayed in the second region or cell based on the first AR experience instead of having the second AR experience applied. The modified video based on the first AR experience can then be merged into or included as part of the first region or cell and the second region or cell can be removed from the graphical user interface.

Figure 6A:
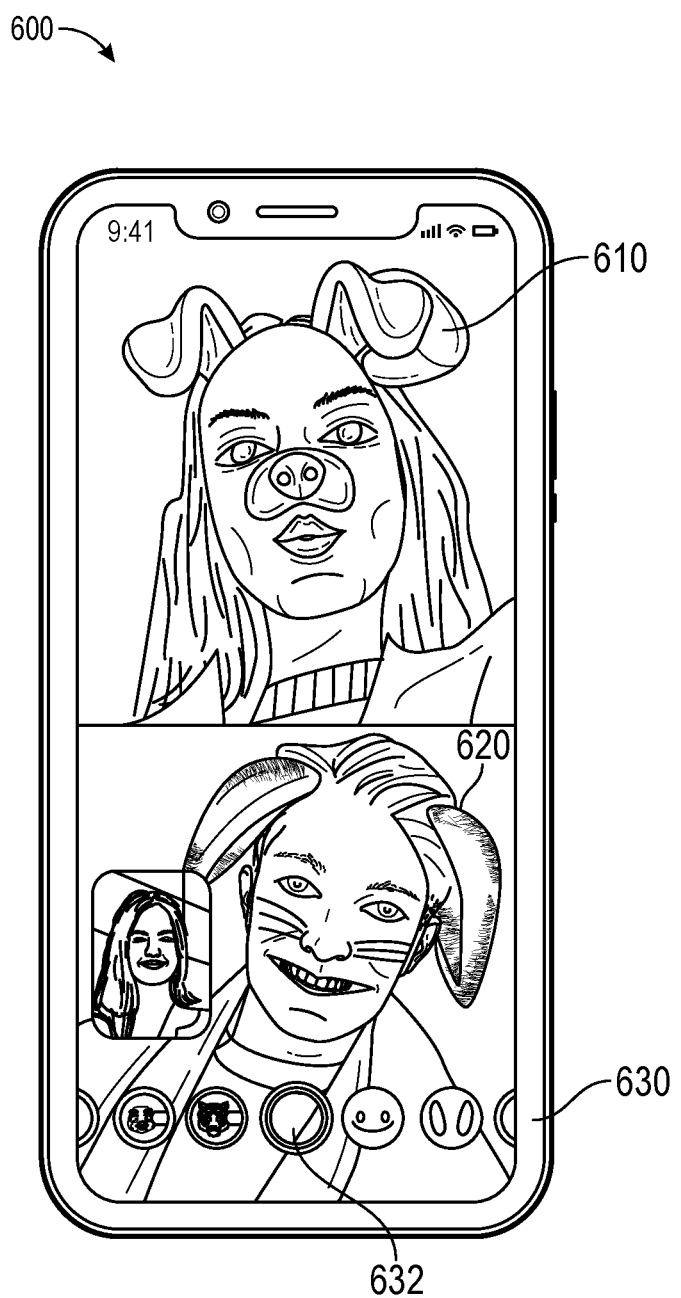
FIGS. 6A, 6B, 7A, 7B, and 8 are diagrammatic representations of outputs of the AR video chat system, in accordance with some examples.

FIGS. 6A, 6B, 7A, 7B, and 8 are diagrammatic representations of outputs of the AR video chat system 224, in accordance with some examples. For example, as shown in FIG. 6A, a user interface 600 is displayed on a screen of a first client device 102 of a first user. The first client device 102 can be engaged in a video chat session with a second client device 102. A first real-time video can be received from the first client device 102 and presented in a first region, such as a top of the graphical user interface. A second real-time video can be received from the second client device 102 and presented in a second region, such as a bottom of the graphical user interface. In some cases, the video chat can be started before a shared AR experience is selected. In this case, the shared AR experience can be selected and used to invite users in the video chat after establishing the video chat. In some examples, the shared AR experience can first be selected and used in an invitation sent to one or more users to initiate or establish the video chat in which the shared AR experience is automatically launched and applied.

The user interface 600 includes a list of AR experiences 630, such as a shared AR experience 632 and other AR experiences that are displayed at the bottom of the screen of the first client device 102 overlaying the first video. The first client device 102 can receive input from the first user that navigates between the list of AR experiences 630 to select the shared AR experience 632. In response to receiving the input selecting the shared AR experience 632, the first client device 102 transmits a message or notification to the second client device 102 that identifies the shared AR experience 632. The message or notification includes an option for the second user to join the shared AR experience 632. In response to receiving input from the second client device 102 selecting the option to join the shared AR experience 632, the AR video chat system 224 modifies the first and second videos of the first and second users. In some examples, the AR video chat system 224 identifies faces of the first and second users depicted in the first and second videos and applies one or more graphical elements 620 to the first and second faces. For example, a first type of AR element (e.g., a first type of virtual animal ears) associated with the shared AR experience 632 can be applied to the first video 610 and a second type of AR element 620 (e.g., a second type of virtual animal ears) associated with the shared AR experience 632 can be applied to the second video.

The shared AR experience 632 can be associated with a particular theme, such as forest animals, farm animals, fish, aliens, and so forth. Each theme can be associated with a plurality of different AR elements or different AR element types. The AR video chat system 224 can count how many video feeds or users are currently engaged in the video chat and have selected options to join the same AR experience. The AR video chat system 224 can then retrieve a set of different AR elements of the shared AR experience 632 corresponding to the count. Namely, if three users are currently engaged in the same shared AR experience 632, the AR video chat system 224 retrieves three different types of AR elements corresponding to the same AR experience theme. The AR video chat system 224 can then apply each type of AR element that is retrieved to the corresponding video in the graphical user interface 600.

In some examples, the AR experience includes a fishbowl that includes various marine life or virtual fish. In such cases, the AR video chat system 224 generates a single AR environment and crops out portions of the first and second videos of the users involved in the video chat corresponding to faces of the users. The AR video chat system 224 can apply a first modification to modify the first face depicted in the first video to represent a first virtual fish and can apply a second modification to modify the second face depicted in the second video to represent a second virtual fish. The AR video chat system 224 can then add the first and second virtual fish as animated characters swimming in the AR environment (fishbowl) that is presented to the users involved in the video chat. The AR video chat system 224 can allow users involved in the AR experience to modify contents of the fishbowl. For example, the AR video chat system 224 can receive a tap input from the first user on the fishbowl. In response, the AR video chat system 224 allows the first user to add virtual contents, such as virtual coral or castles to the fishbowl and/or to modify the type of virtual fish being used to represent the first user. Any modification performed by the first user is instantly visible and displayed to other users of the AR video chat system 224 (e.g., the second user).

In some examples, the AR experience includes a virtual couch in a virtual room. In such cases, the AR video chat system 224 generates a single AR environment and crops out portions of the first and second videos of the users involved in the video chat corresponding to faces and/or bodies of the users. The AR video chat system 224 can apply a first modification to modify the first face depicted in the first video to represent a first avatar and can apply a second modification to modify the second face depicted in the second video to represent a second avatar. The AR video chat system 224 can then add the first and second avatars as animated characters sitting together on the virtual couch that is presented to the users involved in the video chat.

Figure 6B:
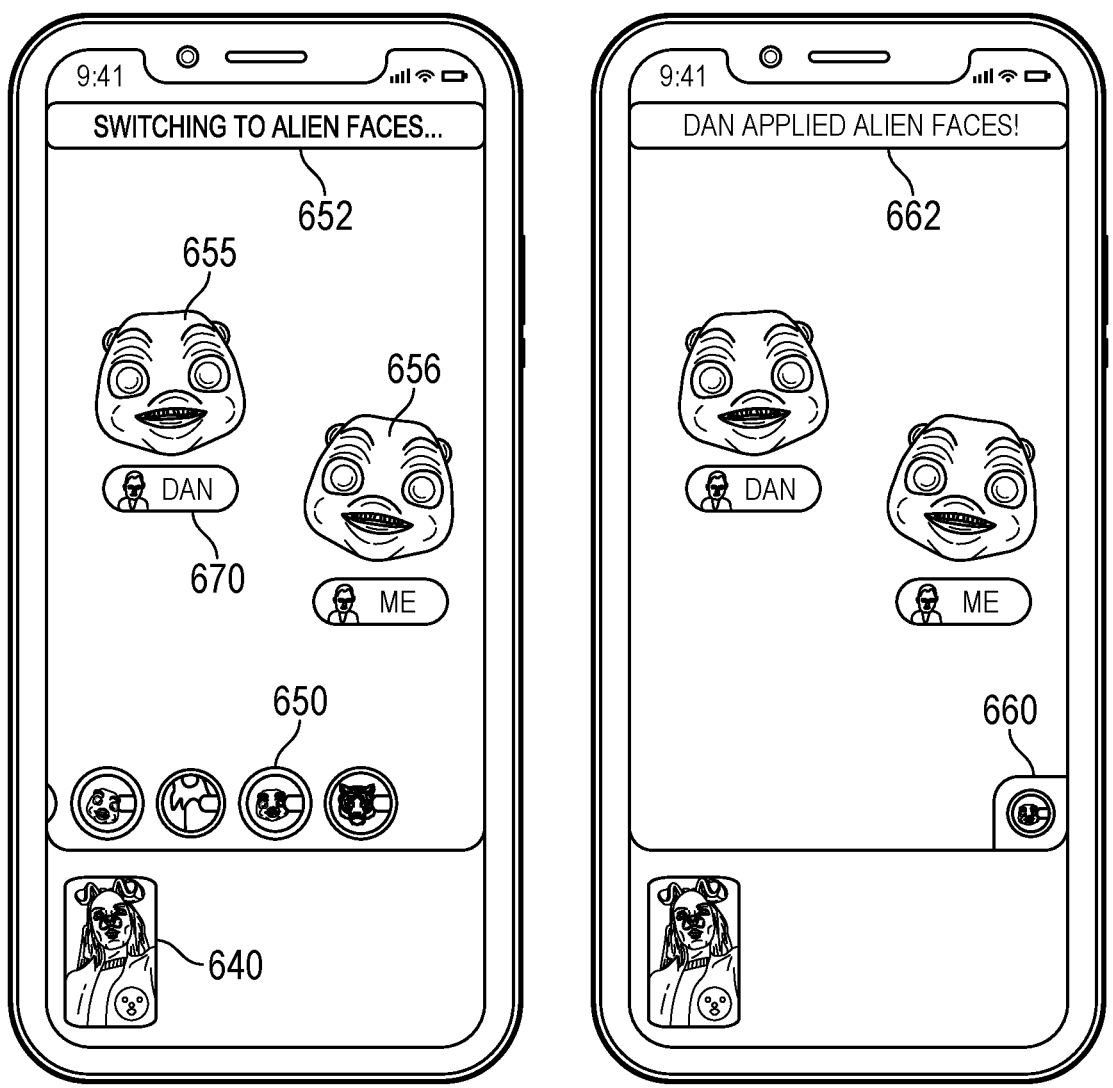

In some examples, as shown in FIG. 6B, after a first shared AR experience is applied to the video chat involving the first and second users, a request from the first client device 102 can be received to switch to a second shared AR experience. Specifically, as shown in graphical user interface 601, a video 640 depicting the first user that is modified based on the first shared AR experience is presented. A request from the first user can be received selecting a second shared AR experience 650. In response to the request, the AR video chat system 224 displays a notification 652 informing the first user that the AR video chat system 224 is switching to the second shared AR experience 650. The notification 652 can identify the second shared AR experience 650 by name or other attribute.

The AR video chat system 224 transmits a notification 662 to the second client device 102 indicating that the first user has applied the second shared AR experience 650. In this case, the AR video chat system 224 automatically applies the second shared AR experience 650 to the videos of the first and second users without inviting the second user to join first. This is because the second user already accepted the invitation to join the shared AR experience 632 with the first user in the video chat, as explained in connection with graphical user interface 600. The AR video chat system 224 can present an icon 660 that identifies the second shared AR experience 650 to the second user after or before applying the AR elements of the second shared AR experience 650.

The AR video chat system 224 can generate a full-screen display of an AR environment (e.g., an AR outer space view). The AR video chat system 224 can crop out portions of the first and second videos of the users involved in the video chat corresponding to faces of the users. The AR video chat system 224 can apply a first modification to modify the first face depicted in the first video to represent a first animated character (e.g., animated alien 655) and can apply a second modification to modify the second face depicted in the second video to represent a second animated character (e.g., animated alien 656). The AR video chat system 224 can then add the first and second animated characters (e.g., aliens 655 and 656) as floating in the AR environment that is presented to the users involved in the video chat. The AR video chat system 224 can also display names of the users adjacent to or underneath each of the first and second animated characters (e.g., aliens 655 and 656).

Figure 7A:
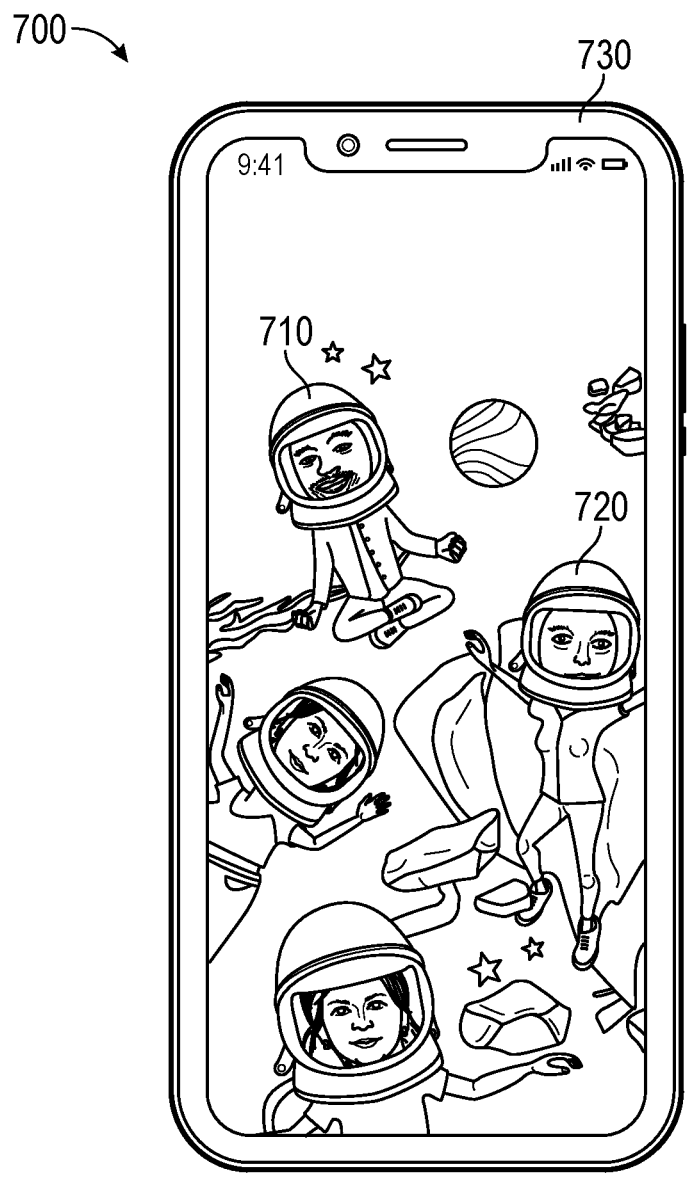

In some examples, the AR video chat system 224 can receive a request from a third user to join the video chat in which the second AR experience is displayed. In response, the AR video chat system 224 can access video from the third client device 102 of the third user and crop out a portion of the video depicting a face of the third user. As shown in FIG. 7A, the AR video chat system 224 can display the faces of each of the users involved in the video chat including a first face 710 of a first user and a second face 720 of a second user in an AR environment 730 presented in the user interface 700. The faces that are displayed can appear to float around in an animated fashion. The faces can be updated based on changes to the faces detected in the real-time video feeds received from the client devices 102 of the users involved in the video chat.

Figure 7B:
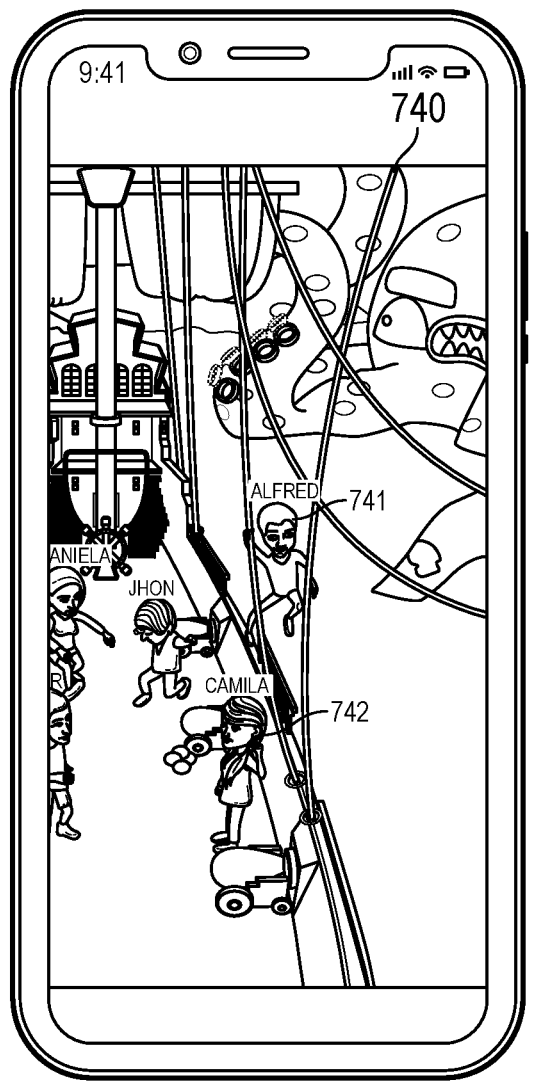

In some examples, the AR video chat system 224 can present a virtual environment corresponding to a virtual game in graphical user interface 701 (FIG. 7B). In this case, the AR video chat system 224 can display the avatars of each of the users involved in the video chat including a first avatar 741 of a first user and a second avatar 742 of a second user in an AR environment 740 presented in the user interface 701. The users can interact with the AR environment 740 using their voices or by performing various gestures during the course of the video chat. The AR video chat system 224 can present names of the users involved in the video chat underneath or adjacent to the corresponding avatar that is displayed.

Figure 8:

As shown in FIG. 8, a user interface 800 is displayed on a screen of a first client device 102 of a first user. The user interface 800 includes a first region or cell 820 associated with video received from a first client device 102 of the first user. The user interface 800 includes a second cell or region 810 associated with videos received from second and third client devices 102 of second and third users. Namely, the AR video chat system 224 can divide the user interface 800 of the video chat session into different regions each associated with the AR experience that is launched or activated by a particular client device 102.

For example, the second and third client devices 102 can be initially involved with a first shared AR experience in which virtual character parts (e.g., virtual animal parts) are used to modify the corresponding videos. The first user can join the video chat with the second and third client devices 102. The first user can launch a second shared AR experience in which a different type of modification is applied to the video than the modifications being applied to the videos of the second and third users. In response to determining that the first user has launched a second shared AR experience, the AR video chat system 224 can present an option 830 to the client devices 102 of the second and third users to join in the shared AR experience of the first user. The option 830 can identity the shared AR experience currently launched or activated by the first user and a name of the first user. In this way, prior to selection of the option 830, the graphical user interface 800 determines that the first user is associated with a first AR experience and that the second and third users are associated with a second AR experience. In response, the AR video chat system 224 presents video of the first user in the first region or cell 820 and videos of the second and third users in a second cell or region 810.

The AR video chat system 224 can receive input from the second and third users that selects the option 830 to join the first user in the shared AR experience currently active for the first user. In response, the AR video chat system 224 removes the modification being applied to the videos of the second and third users associated with the first shared AR experience. The AR video chat system 224 applies the second shared AR experience modification to the videos of the second and third users and adds the modified videos to a same cell or region 801 of the graphical user interface as the first user. In some examples, the AR video chat system 224 displays a full-screen display of the videos of the first, second and third users modified based on the second shared AR experience. For example, each of the first, second and third users can be represented as different virtual characters (e.g., virtual cats or animals) using their respective faces depicted in the videos received from their respective devices. Specifically, the first user can be represented by a first virtual character (e.g., virtual cat 840) and a second user can be represented by a second virtual character (e.g., a virtual tiger 841). Movements performed by the faces of the user can continuously be monitored and used to adjust the facial expressions of the respective virtual characters (e.g., animals) used to represent the users during the video chat.

Figure 9:
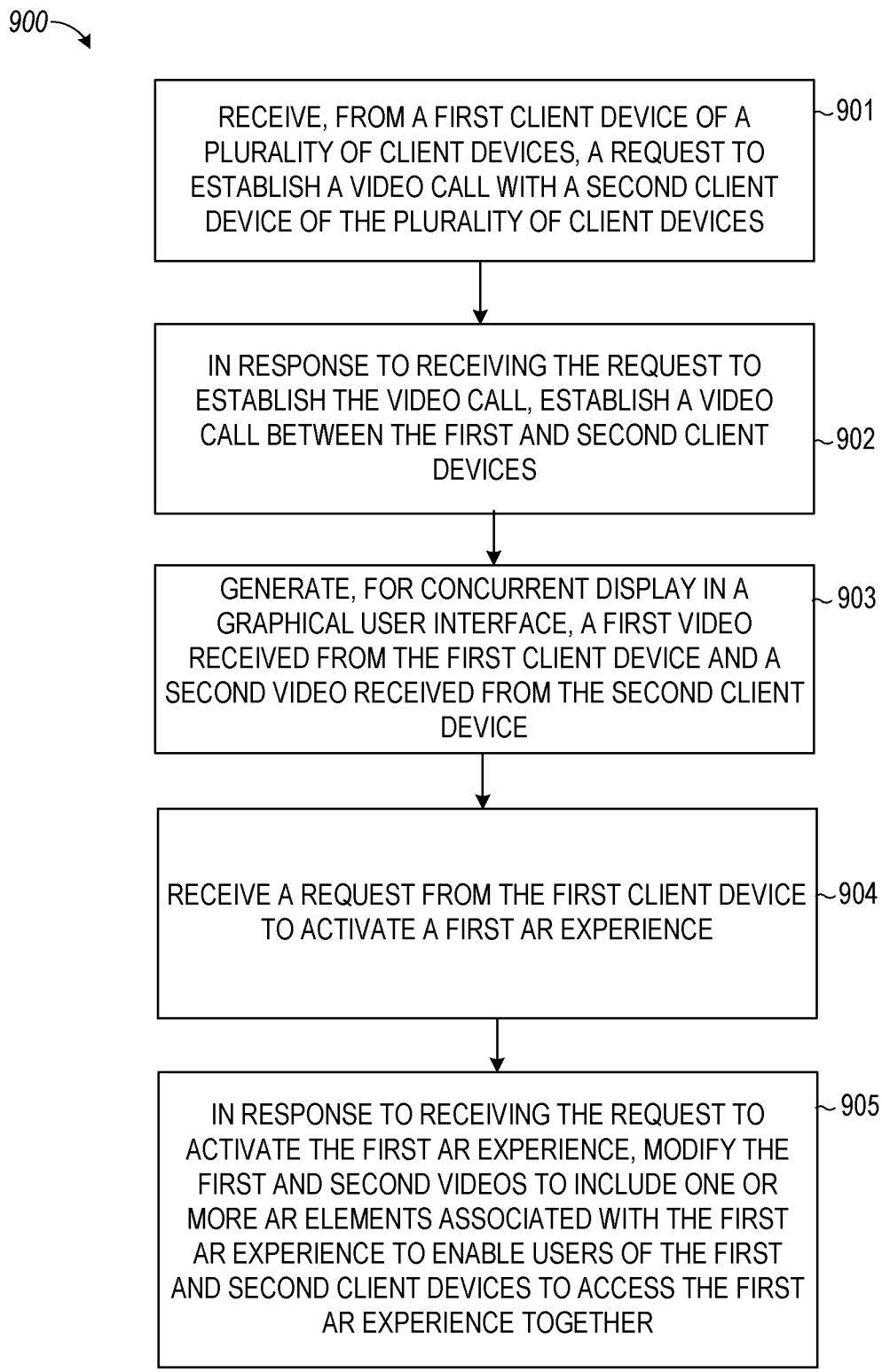
FIG. 9 is a flowchart illustrating example operations of the AR video chat system, according to some examples.

FIG. 9 is a flowchart of a process 900 performed by the AR video chat system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the AR video chat system 224 (e.g., a client device 102 or one or more of the messaging server system 108 components) receives, from a first client device of a plurality of client devices, a request to establish a video call with a second client device of the plurality of client devices, as discussed above.

At operation 902, the AR video chat system 224, in response to receiving the request to establish the video call, establishes a video call between the first and second client devices, as discussed above.

At operation 903, the AR video chat system 224 generates, for concurrent display in a graphical user interface, a first video received from the first client device and a second video received from the second client device, as discussed above.

At operation 904, the AR video chat system 224 receives a request from the first client device to activate a first AR experience, as discussed above.

At operation 905, the AR video chat system 224, in response to receiving the request to activate the first AR experience, modifies the first and second videos to include one or more AR elements associated with the first AR experience to enable users of the first and second client devices to access the first AR experience together, as discussed above.

Machine Architecture

Figure 10:
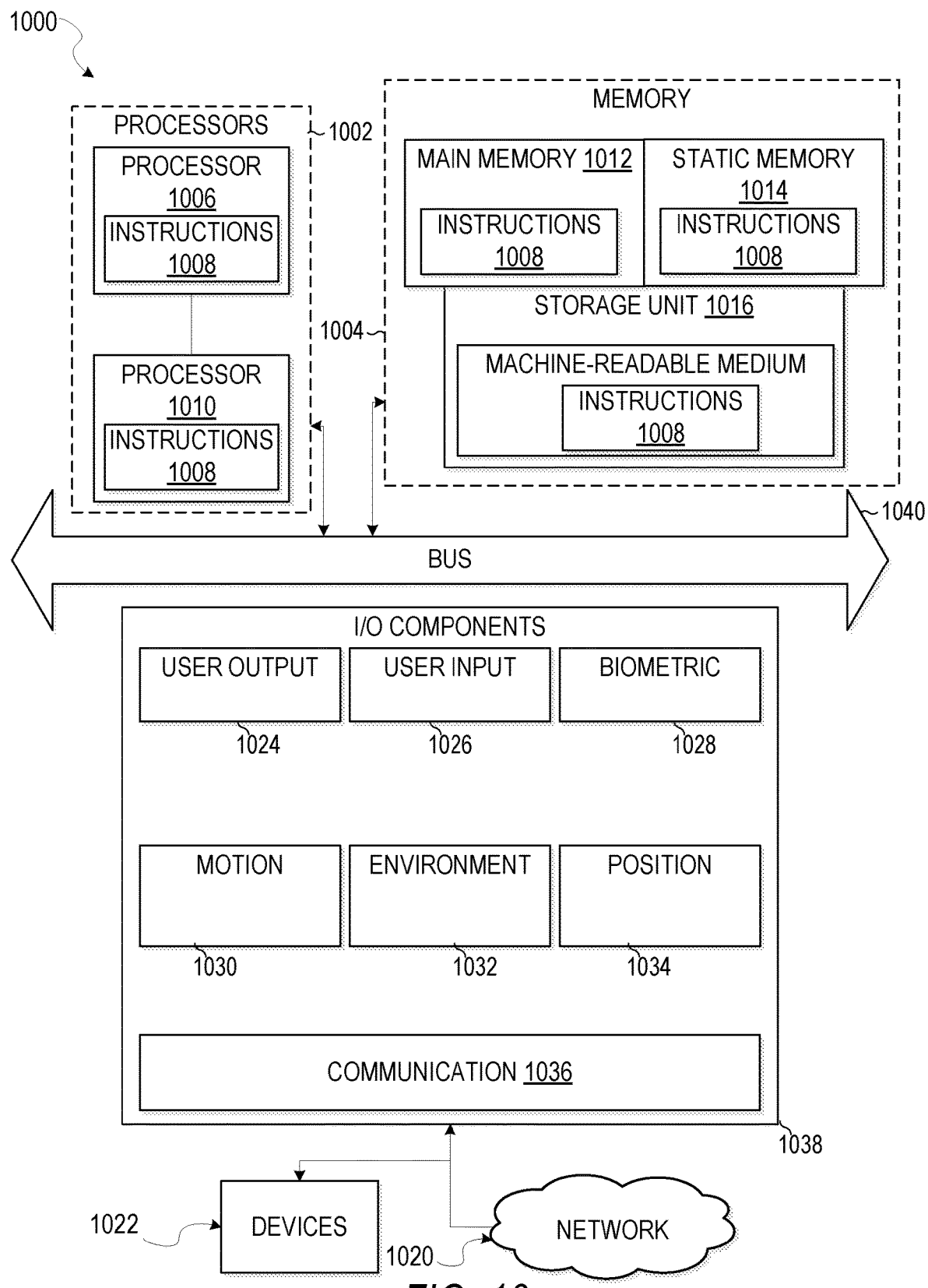
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1012, the static memory 1014, and the storage unit 1016 store the instructions 1008 embodying any one or more of the methodologies or functions described herein. The instructions 1008 may also reside, completely or partially, within the main memory 1012, within the static memory 1014, within a machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
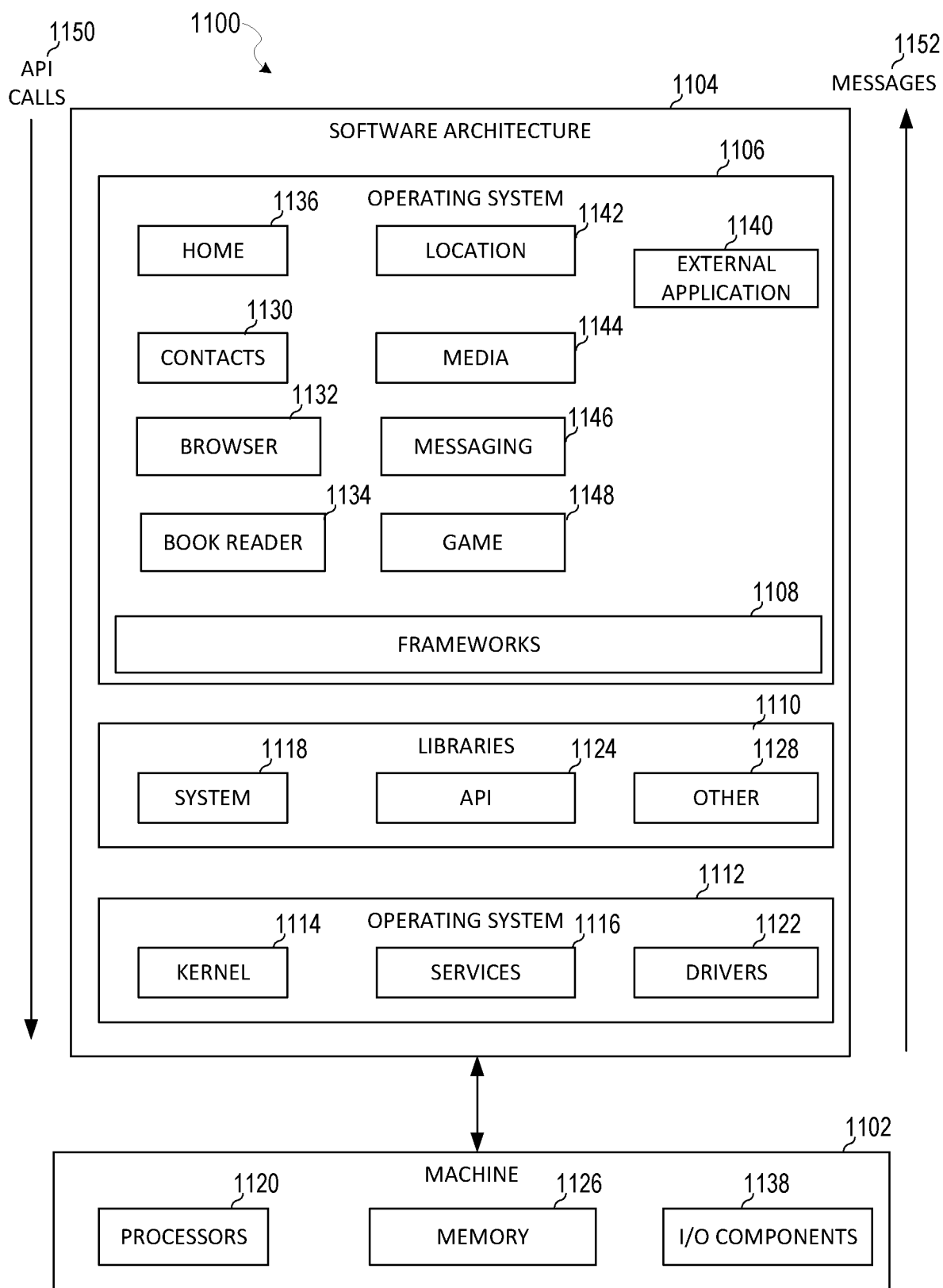
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, from a first device of a plurality of devices, a request to establish a video call with a second device of the plurality of devices;
in response to receiving the request to establish the video call, establishing a video call between the first and second devices;
generating, for concurrent display in a graphical user interface, a first video received from the first device and a second video received from the second device;
receiving a request from the first device to activate a first augmented reality (AR) experience during the video call; and
in response to receiving the request to activate the first AR experience:
cropping a first body part of a first user depicted in the first video and a second body part of a second user depicted in the second video;
modifying the first and second body parts using one or more AR elements associated with the first AR experience; and
adding the first and second body parts that have been modified using the one or more AR elements to a common background representing a virtual environment of the first AR experience to enable users of the first and second devices to access the first AR experience together.

2. The method of claim 1, further comprising:
displaying a first cell representing a user of a third device together with a second cell comprising the first and second body parts that have been modified using the one or more AR elements on the common background; and
dividing the graphical user interface into a plurality of cells comprising the first and second cells based on a determination of whether the first AR experience is being accessed by the third device.

3. The method of claim 1, further comprising:
displaying on the first device a list of options each associated with a different AR experience; and
detecting input from the first device that selects a first option from the list of options associated with the first AR experience, wherein the request to activate the first AR experience is generated in response to detecting the input.

4. The method of claim 1, further comprising:
obtaining a first list of identifiers of shared AR experiences available on the first device;
obtaining a second list of identifiers of shared AR experiences available on the second device;
comparing the first and second lists of identifiers of the shared experiences to identify a set of shared AR experiences that is available in both the first list of identifiers and the second list of identifiers; and
displaying the set of shared AR experiences that is available in both the first list of identifiers and the second list of identifiers.

5. The method of claim 1, further comprising:
determining that the first AR experience is currently unavailable to the second device; and
in response to determining that the first AR experience is currently unavailable to the second device, causing an option to be displayed on the second device to download the first AR experience or receive temporary access to the first AR experience and automatically authorize activation of the first AR experience, wherein the second video is modified in response to receiving a selection of the option from the second device.

6. The method of claim 1, further comprising:
detecting a first face of a first user in the first video and a second face of a second user in the second video;
applying a first AR element associated with the first AR experience to the first face; and
applying a second AR element associated with the first AR experience to the second face.

7. The method of claim 6, wherein the first AR element comprises a first virtual character, and wherein the second AR element comprises a second virtual character.

8. The method of claim 7, further comprising:
generating a display of a virtual environment, wherein the first and second virtual characters are presented in the virtual environment together with names of the respective first and second users.

9. The method of claim 8, wherein the virtual environment comprises a fishbowl, and wherein the first and second virtual characters comprise different types of fish.

10. The method of claim 6, further comprising:
generating a display of a virtual environment comprising a virtual couch, wherein the first and second AR elements are presented in the virtual environment on the virtual couch together with names of the respective first and second users.

11. The method of claim 1, wherein the first body part comprises a face of the first user and the second body part comprises a face of the second user.

12. The method of claim 1, further comprising:
after adding the first and second body parts that have been modified using the one or more AR elements to a common background representing a virtual environment of the first AR experience, preventing the second device from switching the first AR experience to a second AR experience until a threshold period of time elapses.

13. The method of claim 1, further comprising:
identifying a plurality of different AR elements associated with the first AR experience;
computing a count representing how many video feeds are currently being presented concurrently;
retrieving a set of different AR elements from the plurality of different AR elements based on the computed count, wherein each of the different AR elements in the set of different AR elements is used to modify the first and second body parts.

14. The method of claim 1, further comprising:
adding a third client device to the established video call with the first and second devices; and
displaying a first cell representing a user of the third device together with a second cell comprising the modified first and second videos.

15. The method of claim 14, further comprising:
determining that the first AR experience is inactive by the third device; and
dividing the graphical user interface into a plurality of cells comprising the first and second cells in response to determining that the first AR experience is inactive by the third device.

16. The method of claim 14, further comprising:
receiving a third video from the third device;
displaying the third video in the first cell;
determining that a second AR experience has been activated on the third device; and
generating a display of the third video in the first cell modified based on the second AR experience together with a display of the first and second videos modified based on the first AR experience in the second cell.

17. The method of claim 16, further comprising:
receiving a request from the third device to activate the first AR experience; and
in response to receiving the request from the third device to activate the first AR experience:
modifying the third video based on the first AR experience; and
adding the modified third video to the second cell for display together with the modified first and second videos.

18. The method of claim 17, further comprising removing the first cell from the graphical user interface in response to adding the modified third video to the second cell for display together with the modified first and second videos.

19. A system comprising:
at least one processor; and
a memory component having instructions stored thereon that, when executed by the at least one processor, cause the at least one processor to perform operations comprising:
receiving, from a first device of a plurality of devices, a request to establish a video call with a second device of the plurality of devices;
in response to receiving the request to establish the video call, establishing a video call between the first and second devices;
generating, for concurrent display in a graphical user interface, a first video received from the first device and a second video received from the second device;
receiving a request from the first device to activate a first augmented reality (AR) experience during the video call; and
in response to receiving the request to activate the first AR experience:
cropping a first body part of a first user depicted in the first video and a second body part of a second user depicted in the second video;
modifying the first and second body parts using one or more AR elements associated with the first AR experience; and
adding the first and second body parts that have been modified using the one or more AR elements to a common background representing a virtual environment of the first AR experience to enable users of the first and second devices to access the first AR experience together.

20. A non-transitory computer-readable storage medium having stored thereon instructions that, when executed by a processor, cause the processor to perform operations comprising:
receiving, from a first device of a plurality of client devices, a request to establish a video call with a second device of the plurality of devices;
in response to receiving the request to establish the video call, establishing a video call between the first and second devices;
generating, for concurrent display in a graphical user interface, a first video received from the first device and a second video received from the second device;
receiving a request from the first device to activate a first augmented reality (AR) experience during the video call; and
in response to receiving the request to activate the first AR experience:
cropping a first body part of a first user depicted in the first video and a second body part of a second user depicted in the second video;
modifying the first and second body parts using one or more AR elements associated with the first AR experience; and
adding the first and second body parts that have been modified using the one or more AR elements to a common background representing a virtual environment of the first AR experience to enable users of the first and second devices to access the first AR experience together.

* * * * *